April 13, 1926.

E. S. NIESTRADT 1,580,155

TERRA COTTA TOOLING MACHINE

Filed August 1, 1924

Inventor
Ernest S. Niestradt
By A. J. O'Brien
Attorney

Patented Apr. 13, 1926.

1,580,155

UNITED STATES PATENT OFFICE.

ERNEST S. NIESTRADT, OF DENVER, COLORADO.

TERRA-COTTA TOOLING MACHINE.

Application filed August 1, 1924. Serial No. 729,512.

*To all whom it may concern:*

Be it known that I, ERNEST S. NIESTRADT, a citizen of the United States, residing at Denver, the city and county of Denver and State of Colorado, have invented certain new and useful Improvements in Terra-Cotta Tooling Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in terra cotta tooling machines.

In the construction of buildings, it is customary to employ terra cotta to a great extent, especially for such parts as the coping and the portions which are to be ornamented, as the terra cotta can be molded in molds prepared from models or patterns of the desired shape and design, whereas stone must be carved and even when there are a large number of duplicates, they all require the same amount of labor.

Architects often require the surface of a building to be tooled or in other words, require the blocks of stone or other material of which it is built, to be striated by having their exposed surfaces cut into parallel ridges and grooves of various cross section. When the building material is stone, this tooling is, as a general rule, done by hand. When terra-cotta is employed, the surface of the mold may be striated in the reverse manner so that the block will have the proper stria when finished. It has been customary to tool the inner surface of the mold by hand, a tool being first prepared which is provided with teeth and depressions corresponding exactly with those desired on the finished block. A workman draws this tool across the surface of the mold, against which the face of the block is to be formed until the entire surface thereof has been properly tooled. The labor of preparing the mold in this manner is very great and requires great strength and endurance on the part of the worker.

It is the object of this invention to produce a machine, by means of which molds for terra cotta blocks and the surfaces of marble or stone blocks can be tooled and striated with great rapidity and with the expenditure of only a small amount of strength and labor on the part of the operator.

My improved machine, briefly described, consists of a base formed by two parallel metal plates spaced a short distance apart and provided with bearings within which is rotatably mounted a shaft, which carries cutters. A motor is adjustably secured to said base and is connected to the shaft by means of a belt or other suitable connection so that it will rotate the cutters. The machine is slidably mounted between parallel guide members, which rest upon the surface of the material to be tooled. The parts are adjusted so that the cutters will cut into the material to the proper depth. The machine is pulled across the surface of the material and striates the same. When one row of striations have been finished, the guides are moved relative to the block so as to bring the cutters into position to cut another row.

Having thus briefly described my machine, I shall now proceed to describe the same in detail, reference for this purpose being had to the accompanying drawing in which the preferred embodiment is shown, and in which.

Figure 1:
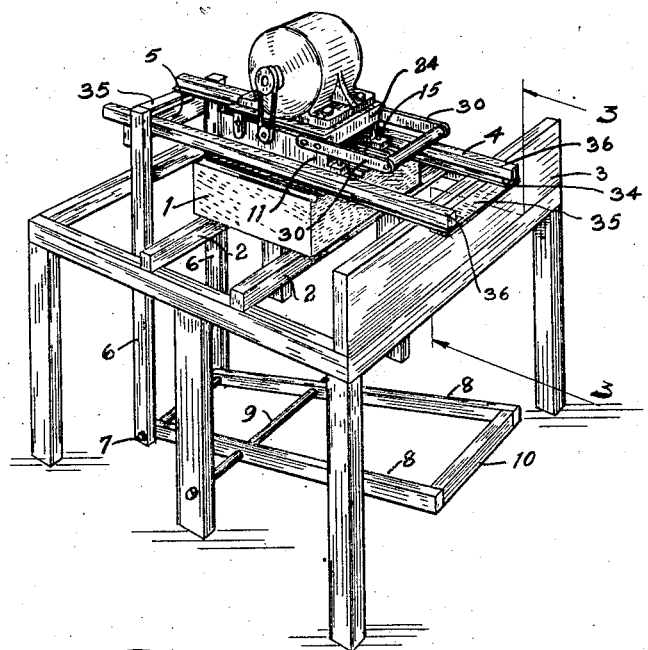
Fig. 1 is a perspective view showing my machine in position for tooling a block of material.

In Fig. 1 I have shown a table or framework for supporting the material while it is being tooled. The material indicated by the numeral 1 is supported on bars 2. To the upper front edge of the frame or table, I secure a board 3, which serves as a support for the front end of the guide 4. The rear end of the guide is supported by a transverse member 5, which in turn is supported from the uprights 6 whose lower ends are pivoted at 7 to the frame 8. Frame 8 is pivoted at 9 and has a transverse member 10 that can be engaged by the foot of the operator for raising the guide 4 while the material 1 is shifted.

Figures 2, 3, 4:
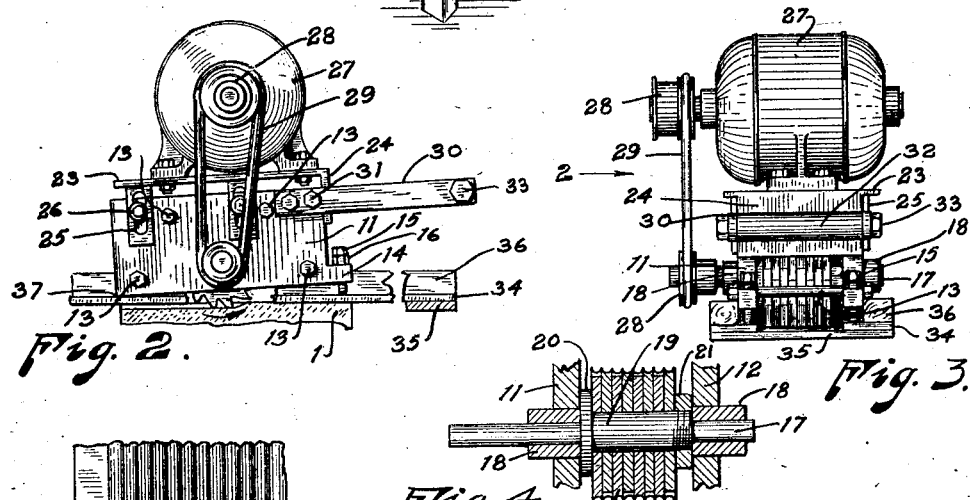
Fig. 2 is a side elevation of the machine showing the manner in which the machine is supported on the guide and adjusted in a vertical direction with respect thereto.
Fig. 3 is an end elevation of the machine, looking in the direction of arrows 3—3, Fig. 1.
Fig. 4 is a section through the cutter shaft.

My machine has a base consisting of two substantially identical plates 11 and 12 of any suitable metal. These plates are held in spaced parallel relation by means of the bolts 13, which are preferably threadedly connected to the plates. The front ends of plates 11 and 12 have short projections 14, which are provided with threaded openings for the reception of the adjusting screws 15, which are locked in adjusted position by means of lock nuts 16, the purpose of which will hereinafter appear. A shaft 17 extends through the plates 11 and 12 and is rotatably mounted in bushings 18. This shaft has a central portion 19 of increased diameter provided at one end with a flange 20 and having the other end threaded for the reception of the nut 21. A plurality of toothed cutters 22 are secured to the central portion 19 by means of the nut 21. The cutters have their teeth curved transversely in such a manner that they will produce the desired type of striations. The cutters are independently adjustable on the shaft in order that the teeth may be staggered, as shown in Figs. 2 and 3 so that they will not break out the material as they would have a tendency to do if they were all on a straight line. A motor support 23 consisting of a plate of sheet metal with its front edge 24 bent at right angles so as to provide a guard, is provided with two pairs of downwardly extending slotted brackets 25. Bolts 26 pass through the slots in the brackets 25 and serve to clamp the motor support to the sides. Secured to the support 23 is a motor 27. Secured to corresponding ends of the shaft 17 and the motor shaft are compound pulleys 28, which can be employed either with round or flat belts. In the drawing these pulleys have been shown as connected by a round belt 29, which forms the power-transmitting means by which the motor rotates the shaft 17. A pair of parallel bars 30 have one end secured to the sides 11 and 12 by means of bolts 31. The other end of bars 30 are spaced by a short length of pipe 32, which forms the hand grip. A bolt 33 serves to clamp the bars against the ends of the pipe 32. Bars 30 and associated parts form a handle by means of which the machine is pulled and pushed along the guide 4. The guide consists of two parallel, flat metal strips 34 whose ends are joined by transverse bars 35. Wooden strips 36 of less width than the bars 34 are connected to the latter. These strips are spaced apart a sufficient distance to permit the base of the machine to extend down between them and to rest on the bars 34 in the manner shown in Fig. 2. The rear lower corner 37 of the base and the ends of the screws 15 rest upon the upper surface of the bars 34 in the manner shown in Fig. 2. By rotating the screws 15, the machine can be tilted relative to the guides so as to alter the depth to which the cutters will enter the material 1. It is the intention to have the parts so arranged that the guide 4 rests upon the surface of the material that is to be striated while the work is being done. The mechanism shown in Fig. 1 is intended to raise the guide from the work when the latter is to be moved.

Figure 5:
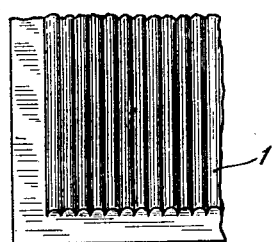
Fig. 5 is a perspective view showing a portion of a mold after the surface thereof has been striated.

Let us now assume that the parts are adjusted in the desired manner and arranged as shown in Fig. 1. The motor will rotate the cutters at a high speed and they will cut the upper surface of the material 1 into parallel ridges somewhat as shown in Fig. 5. After one row of ridges have been made, pressure is exerted on the bar 10. This raises the guide. The material is now shifted and the guide dropped down upon it and adjusted so that when the machine is pulled along the guide, another row of ridges is provided. This is continued until the entire surface of the material has been tooled.

Although it is our intention to employ the machine mainly in connection with the preparation of molds for terra cotta blocks, it can also be used for tooling granite, marble or other stone.

Having now described my invention and the manner in which it is used, what I claim as new is:

1. In a device for tooling terra cotta moulds, in combination, a supporting framework, means carried by said framework for supporting a terra cotta mould, a supporting member extending upwardly from the forward end of the framework, a pair of spaced, parallel guides forming a guideway having its forward end supported on said supporting member, a support for the rear end of said guideway, means for raising and lowering the last named support and a tooling machine slidable in said guideway.

2. In a device for tooling terra cotta moulds, in combination, a supporting framework, means carried by said framework for supporting a terra cotta mould, a supporting member extending upwardly from the forward end of the framework, a pair of spaced, parallel guides forming a guideway having its forward end supported on said supporting member, a support for the rear end of said guideway, means for raising and lowering the last named support and a tooling machine in said guideway, said tooling machine being provided with a rotatable cutter having a plurality of spaced cutter disks and with means for rotating the cutter.

3. A tooling machine comprising, in combination, base composed of two, spaced, parallel plates, means for holding said plates in spaced relation, a cutter shaft extending at right angles to said plates and mounted for rotation therein, spaced cutters carried by said shaft, said cutters being located between said plates, the cutting edge of said cutters projecting below the lower edge of said plates, a motor secured to said plates above said cutter, means for transmitting power from the motor to the cutter and means for preventing the cutter from moving transversely of the base.

4. A tooling machine comprising, in combination, a base composed of two, spaced, parallel plates, means for holding said plates in spaced relation, a cutter shaft extending at right angles to said plates and mounted for rotation therein, spaced cutters carried by said shaft, said cutters being located between said plates, the cutting edge of said cutters projecting below the lower edge of said plates, a motor secured to said plates above said cutter, means for transmitting power from the motor to the cutter, means for preventing the cutter from moving transversely of the base, and means for varying the height of the front end of the plates above a supporting surface.

5. A tooling machine comprising a base member composed of two spaced, parallel plates, a cutter shaft extending at right angles to said plates and mounted for rotation therein, cutters carried by said shaft, said cutters being located between said plates, a motor secured to said plates above said cutter, means for connecting the motor to the shaft in such a manner that the shaft will be rotated thereby, means for preventing the cutter from moving transversely of the base, guide means comprising two spaced parallel members adapted to support the machine and to cause the same to move in a predetermined path, and means carried by the base members for engaging the guides and for adjusting the base vertically with respect to the guides.

In testimony whereof I affix my signature.

ERNEST S. NIESTRADT.